US008151424B2

(12) United States Patent
Dimoff et al.

(10) Patent No.: US 8,151,424 B2
(45) Date of Patent: Apr. 10, 2012

(54) APPARATUS AND METHOD FOR EXTRACTING A SURFACE COMPONENT

(76) Inventors: John Dimoff, Hinsdale, IL (US); Martin Halm, Western Springs, IL (US)

( * ) Notice: Subject to any disclaimer, the term of this patent is extended or adjusted under 35 U.S.C. 154(b) by 492 days.

(21) Appl. No.: 12/319,976

(22) Filed: Jan. 14, 2009

(65) Prior Publication Data

US 2010/0178134 A1 Jul. 15, 2010

(51) Int. Cl.
*B23P 19/04* (2006.01)

(52) U.S. Cl. ............................... 29/244; 29/270; 29/255

(58) Field of Classification Search .................... 29/244, 29/251, 255, 252, 270–278
See application file for complete search history.

(56) References Cited

U.S. PATENT DOCUMENTS

| | | | | |
|---|---|---|---|---|
| 3,359,618 | A * | 12/1967 | Murphy | 29/282 |
| 3,880,604 | A * | 4/1975 | Hawkins | 29/252 |
| 5,005,813 | A * | 4/1991 | Lawrence | 269/236 |
| 6,122,811 | A * | 9/2000 | Shirley | 29/281.1 |
| 6,131,261 | A * | 10/2000 | Michlin | 29/251 |
| 6,247,216 | B1 * | 6/2001 | Rader, Jr. | 29/252 |
| 6,266,859 | B1 * | 7/2001 | Hernandez | 29/256 |
| 6,402,130 | B1 * | 6/2002 | Price et al. | 269/91 |
| 6,722,179 | B1 * | 4/2004 | Ventura | 72/454 |
| 7,272,886 | B2 * | 9/2007 | Thomson | 29/724 |
| 2010/0178134 | A1 * | 7/2010 | Dimoff et al. | 414/10 |

FOREIGN PATENT DOCUMENTS

| | | | |
|---|---|---|---|
| DE | 10203017 | A1 | 8/2003 |
| EP | 0551828 | A1 | 1/1993 |
| FR | 2752855 | | 3/1998 |
| FR | 2752855 | A1 | 3/1998 |
| GB | 2243801 | | 11/1991 |
| JP | 08-53810 | | 2/1996 |
| JP | 08-053810 | | 2/1996 |
| JP | 10-266119 | | 6/1998 |
| JP | 10-266119 | | 10/1998 |

* cited by examiner

*Primary Examiner* — Lee D Wilson
(74) *Attorney, Agent, or Firm* — Olson & Cepuritis, Ltd.

(57) ABSTRACT

Apparatus and methods are provided for extracting surface components having an attachment and installed within a surface. In one embodiment, a tool includes a cross member located between a lifting device and a lift plate having an engagement for engaging the attachment. A lift member extends from the lift plate extending through the cross member so as to engage the lifting device so that the lift member is mounted for tilting displacement with respect to the cross member. In another embodiment, a tool for extracting a surface component includes a cross member engaged by supports extending to the surface, for supporting the ends of the cross member above the surface while supporting the cross member against rotation with respect to the surface. Methods are also disclosed for extracting surface components above a surface.

20 Claims, 7 Drawing Sheets

APPARATUS AND METHOD FOR EXTRACTING A SURFACE COMPONENT

FIELD OF THE INVENTION

The present invention relates to apparatus and methods for removing a surface component from an array of surface components making up a floor, outdoor patio, driveway or the like.

BACKGROUND OF THE INVENTION

One popular method of constructing flooring and paving surfaces is to lay down an array of surface components such as masonry blocks on a substrate such as prepared soil. It has been found desirable to fix the array of surface components once they are laid, to prevent unintentional shifting caused by traffic, erosion and frost heave, for example. Fixing the array of surface components has included mortar and similar jointing materials, as well as sand and aggregate mixtures that are compacted in the cracks between adjacent surface components. Maintenance may be required from time to time to address surface components that have cracked, chipped or otherwise require replacement. At times, one or more surface components must be temporarily removed to allow access beneath the surface and then replaced and re-fixed in position. It is important that the surface components do not become damaged, especially when being removed from the surface array. Accordingly, it has been found inappropriate in many instances to insert pry bars and the like between adjacent surface components to gain a purchase for lifting a component from the surface, since destructive pressure forces are applied to edges of the surface components at a point where they are most susceptible to damage. Advances in the art of surface repair are still being sought.

SUMMARY OF THE INVENTION

In one aspect, the present invention provides novel and improved apparatus and methods for removing surface components installed within a surface, that minimizes the disadvantages associated with the prior art and provides advantages in construction, mode of operation and use. In one example of the apparatus, a tool is provided for extracting a block-like surface component having an attachment and located within a surface. The tool includes a cross member having a medial portion defining an aperture located between opposed ends. A surface engaging support is provided for supporting the ends of the cross member above the surface. A lifting device is located above the cross member and a lift plate is located below the cross member. The lift plate includes an engagement for engaging the attachment of the surface component. A lift member extends from the lift plate and includes an upper end extending through the cross member aperture and engaging the lifting device so that the lift member is mounted for tilting displacement with respect to the cross member as the lift member is raised by the lifting device.

In one embodiment, the lift member comprises a drive screw having an upper threaded end that is threadingly engaged with the lifting device. The lifting device can include a mechanical operator such as an hydraulic motor or an electric motor, for example. Alternatively, the lifting device can comprise a handle with a threaded bore for threading advancement along the drive screw. A tilting guide such as a hollow collar may be provided between the cross member and handle to support the handle for tilting movement to thereby tilt the drive screw as the handle is threadingly advanced along the drive screw so as to lift the lift plate and hence the surface component.

In another aspect, the present invention provides a novel and improved apparatus including a tool for extracting a block-like surface component having an attachment and installed within a surface. The tool includes a cross member having a medial portion defining an aperture located between opposed ends. A surface engaging support is provided for supporting the ends of the cross member above the surface and to also support the cross member against rotation with respect to the surface. A lift plate is located below the cross member with an engagement for engaging the attachment of the surface component. A lift member extends from the lift plate, and includes an upper end extending through the cross member aperture. A lifting device is located above the cross member to receive support therefrom as the lifting member develops a lifting force. The upper end of the lift member engages the lifting device so that both the lifting member and the surface component are raised by the lifting device.

In one embodiment, the support includes two legs supporting ends of the cross member. Channels defined by the legs receive ends of the lift plate to guide the lift plate during raising and lowering. Feet included with the legs provide improved engagement with the surface to prevent rotation of the legs with respect to the surface as the lifting device is operated. In one example, the lifting device employs a rotary lifting motion that generates the lifting force needed to raise the lift member and hence the surface component.

The present invention also provides a novel and improved method for extracting a block-like surface component having an attachment and located within a surface. The method includes providing a cross member having a medial aperture located between opposed ends, supporting the ends of the cross member above the surface with a surface-engaging support and supporting a lifting device on the cross member. A lift plate, located below the cross member, is provided with an engagement for engaging the attachment of the surface component. The method also includes extending a lift member from the lift plate through the cross member aperture and engaging the lifting device with the lift member so as to mount the lift member for tilting displacement with respect to the cross member as the lift member is raised by the lifting device to lift the block-like surface component above the surface.

The present invention also provides a method for extracting a block-like surface component having an attachment and installed within a surface. The method includes providing a cross member with a medial aperture located between opposed ends, supporting the ends of the cross member above the surface with a support to resist downward and rotational forces and engaging the surface with the support so as to resolve downward and rotational forces applied through the support. The method then continues with providing a lift plate located below the cross member with an engagement for engaging the attachment of the surface component, extending a lift member from the lift plate, through the cross member aperture and supporting a rotary lifting device having a rotary lifting motion with the cross member so as to support the rotary lifting device as the rotary lifting device rotates to develop a lifting force to raise the lift member. As a final step, the method continues with engaging the lift member with the rotary lifting device so as to raise the lift member and hence the block-like surface component above the surface.

BRIEF DESCRIPTION OF THE DRAWINGS

Features of exemplary implementations of the invention will become apparent from the description, the claims and the accompanying drawings in which:

DETAILED DESCRIPTION OF THE PREFERRED EMBODIMENTS

Figure 1:
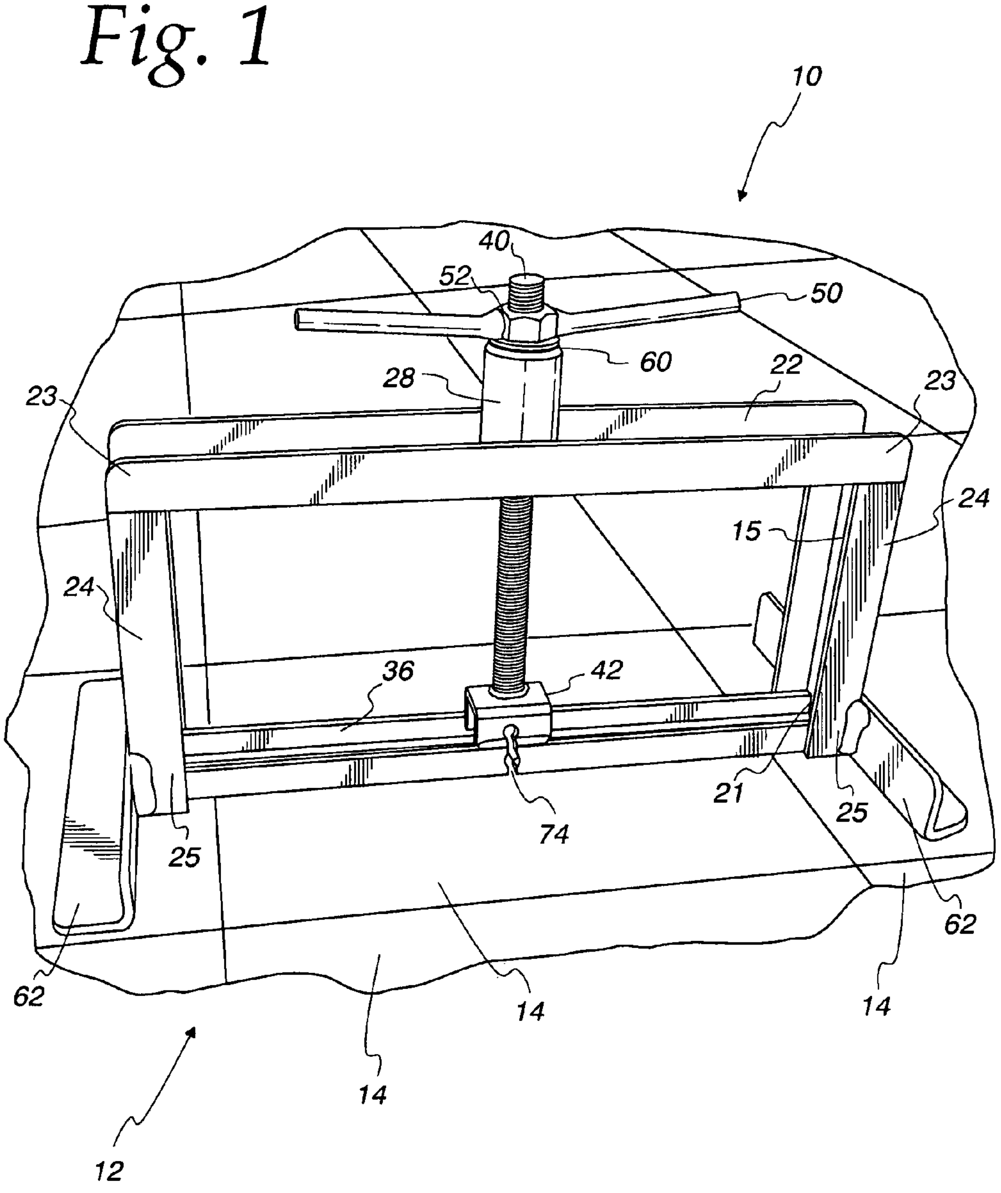
FIG. 1 is a schematic perspective view of a tool according to the present invention.

The invention disclosed herein is, of course, susceptible of embodiment in many different forms. Shown in the drawings and described below in detail are preferred embodiments of the invention. It is understood, however, that the present disclosure is an exemplification of the principles of the invention and does not limit the invention to the illustrated embodiments.

The foregoing descriptions and accompanying drawings are illustrative of the present invention. Still other variations and arrangements of parts are possible without departing from the spirit and scope of the invention. Further, the invention consists of certain novel features and a combination of parts herein fully described, illustrated in the accompanying drawings and particularly pointed out in the appended claims, it being understood that the various changes in the details may be made to one or more of the features without departing from the spirit or sacrificing any of the advantages of the present invention.

Referring now to the drawings, and initially to FIGS. 1-4, an extraction tool generally indicated at 10 is shown positioned on a surface 12 comprising a two dimensional array of surface components 14, arranged to form a floor, patio, driveway or the like. The surface components are preferably of one-piece, monolithic construction, made of masonry or other material and may comprise any form convenient for construction, such as stone slabs, pavement bricks or tiles. Preferably, the surface components are self-supporting, so that, for example, the entire surface component may be moved from one place to another by grasping one or more of its portions. The surface components may be "dry fit" but preferably the gaps between surface components are filled with sand, stone powder, aggregate, mortar or cementitious material, for example that is then compacted or otherwise fixed in position. In FIG. 1 surface components 14 have been outlined for illustrative purposes. In practice, surface component 14, once installed within surface 12 and jointed with sand or other compacted material may be virtually indistinguishable from the remainder of surface 12, requiring a trained eye to identify the edges of the surface component 14 to be extracted.

It is generally preferred that surface component 14 be extracted without requiring a pry bar or other tool applied to its outer peripheral edge as may be expedient for other types of surface constructions. Rather, it is desired that surface component 14 be lifted in a generally vertical direction so as to be plucked from the remainder of surface 12, without requiring the application of tools or other devices to its outer peripheral edges. As will be seen herein, a number of different attachments are provided for engaging surface component 14 to allow an application of a vertical extraction force thereto.

With reference to FIG. 1, tool 10 comprises a frame 20 that includes a cross member 22 and surface-engaging supports or legs 24 having upper ends joined to opposed ends 23 of cross member 22 and lower ends 25 engaging surface 12, on either side of surface component 14. The legs 24 of frame 20 are preferably made of relatively heavy gauge aluminum or steel formed in a U or a C-shaped channel 15 (see FIG. 1). In the illustrated embodiment, cross member 22 is conveniently formed of the same channel material as legs 24, but could have other cross-sectional shapes as well, including solid shapes.

Figure 4:
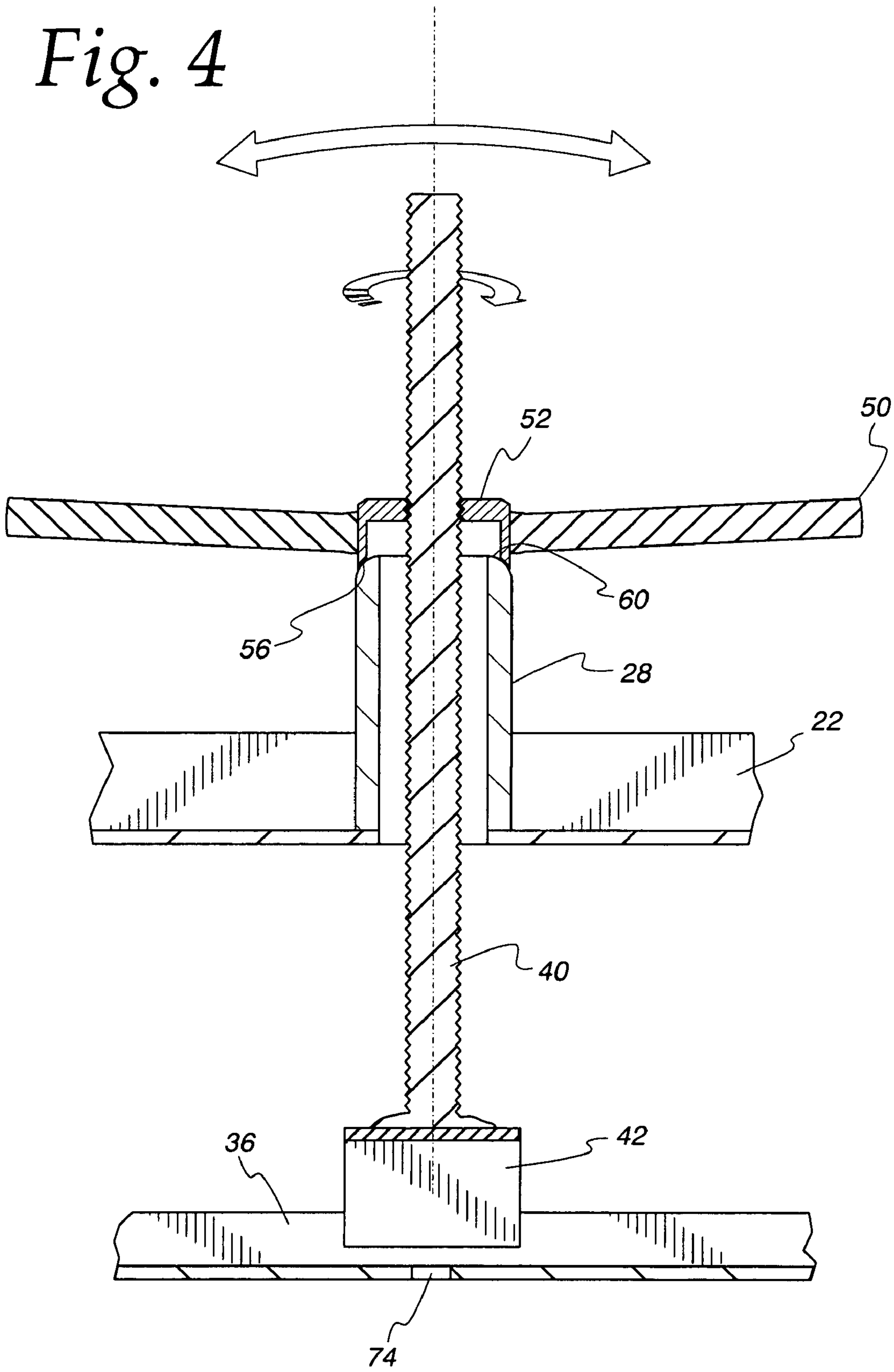
FIG. 4 is a cross-sectional view thereof taken along the line 4-4 of FIG. 3.

A tilting guide in the form of a hollow collar 28 is associated with cross member 22, and is preferably located at the center of cross member 22. Collar 28 may be loosely fitted to cross member 22 (as with a keyed engagement) but preferably is maintained separate from the cross member. Alternatively, collar 28 may be secured to cross member 22 using metallurgical joinder, adhesive or other techniques, as may be desired. With collar 28 maintained loose with respect to cross member 22, a hole in cross member 22 to allow passage of a threaded drive screw 40 therethrough may be slightly oversized to allow the collar to tilt with respect to the cross member during extraction of surface component 14. As shown in FIG. 4, collar 28 includes an upper rounded bearing surface 60 to provide bearing support as well as tilting support for a rotary lifting device such as a handle 50 as shown in the Figures.

A lift plate 36 extends between legs 24 and preferably has end portions 21 received in the channels 15 of legs 24. Preferably, the ends 21 of lift plate 36 (see FIG. 1) are slidably engaged with the channels 15 of legs 24, with the legs providing channelized guided support for the ends 21 of lift plate 36 as the lift plate is reciprocated upwardly and downwardly along legs 24. A lift member in the form of a drive screw 40 is fixedly attached at its lower end to lift plate 36. In the preferred embodiment, a mounting block 42 provides mounting for the bottom end of drive screw 40 with respect to lift plate 36. The mounting block 42 is welded, brazed or otherwise metallurgically joined to both lift plate 36 and drive screw 40. However, other conventional means of attaching mounting block 42 to lift plate 36 and drive screw 40 may also be used.

Drive screw 40 extends upwardly beyond lift plate 36 and has a length sufficient to extend upwardly beyond cross member 22 and collar 28 as shown in the Figures. Collar 28 preferably has an internal bore that is relatively smooth so as to allow ready passage of drive screw 40 therethrough. A lifting device in the form of a handle 50 has a central threaded bore for threadingly engaging the upper end of drive screw 40. Handle 50 has a central hub 52 with a bottom surface 56 slidably engaging the upper bearing surface 60 of collar 28. As torsional force is applied to handle 50, it is threadingly advanced toward the bottom of drive screw 40 and eventually is brought into contact with collar 28. Thereafter, bearing contact is maintained between the bottom surface 56 of hub 52 of handle 50 and the upper bearing surface 60 of collar 28. At the same time, collar 28 mounts the handle for tilting displacement with respect to the cross member as the drive screw is lifted by the handle to lift the surface component above surface 12. It is generally preferred that the cross member restrains the collar 28 against rotation. If desired, however, the collar can be mounted for rotation with respect to the cross member by a ball bearing race, for example.

As described, lifting device or handle 50 is manually operated with a rotational motion to develop lifting force to raise the surface component. The present invention also contemplates lifting devices that are power driven, such as motors and solenoids, and that develop lifting force either with or without a rotational motion. For example, a lever operated cam could be used in conjunction with a lift member that comprises a cable or chain, rather than a drive screw. In more general terms, the present invention contemplates a lift member extending from the lift plate, having an upper end extending through the cross member aperture and engaging the lifting device so that the lift member is mounted for tilting displacement with respect to the cross member as the lift member is raised by the lifting device to lift the block-like surface component above the surface in which it was previously installed.

The bottoms 25 of legs 24 may provide the sole engagement with surface 12, although it is generally preferred that tool 10 includes a pair of feet 62 that increase the area of engagement between tool 10 and surface 12. Preferably, feet 62 extend laterally beyond legs 24 to provide convenient steps for a workman to stand on to augment the frictional normal force between feet 62 and surface 12 or to allow sandbags or other weights to be placed on the feet, so as to further provide measures against rotation of tool 10 with respect to surface 12. As mentioned, the present invention contemplates lifting devices of the rotary type that develop lifting force with a rotary motion. The preferred threaded handle 50 provides such an example. It is important in such arrangements that the rotational motion developed to provide lifting force be adequately supported by the tool frame, to prevent the rotational forces from causing the tool frame, including the cross member, from rotation. Legs 24 and feet 62 provide vertical support for tool 10 as lifting force is developed, while resisting rotational displacement of the tool that may otherwise result from rotational motion associated with the lifting device. The feet 62 are employed for engaging the tool support with the surface so as to resolve downward and rotational forces applied through the support, thus restraining rotation of the feet, and hence the tool, with respect to surface 12.

Figure 7:
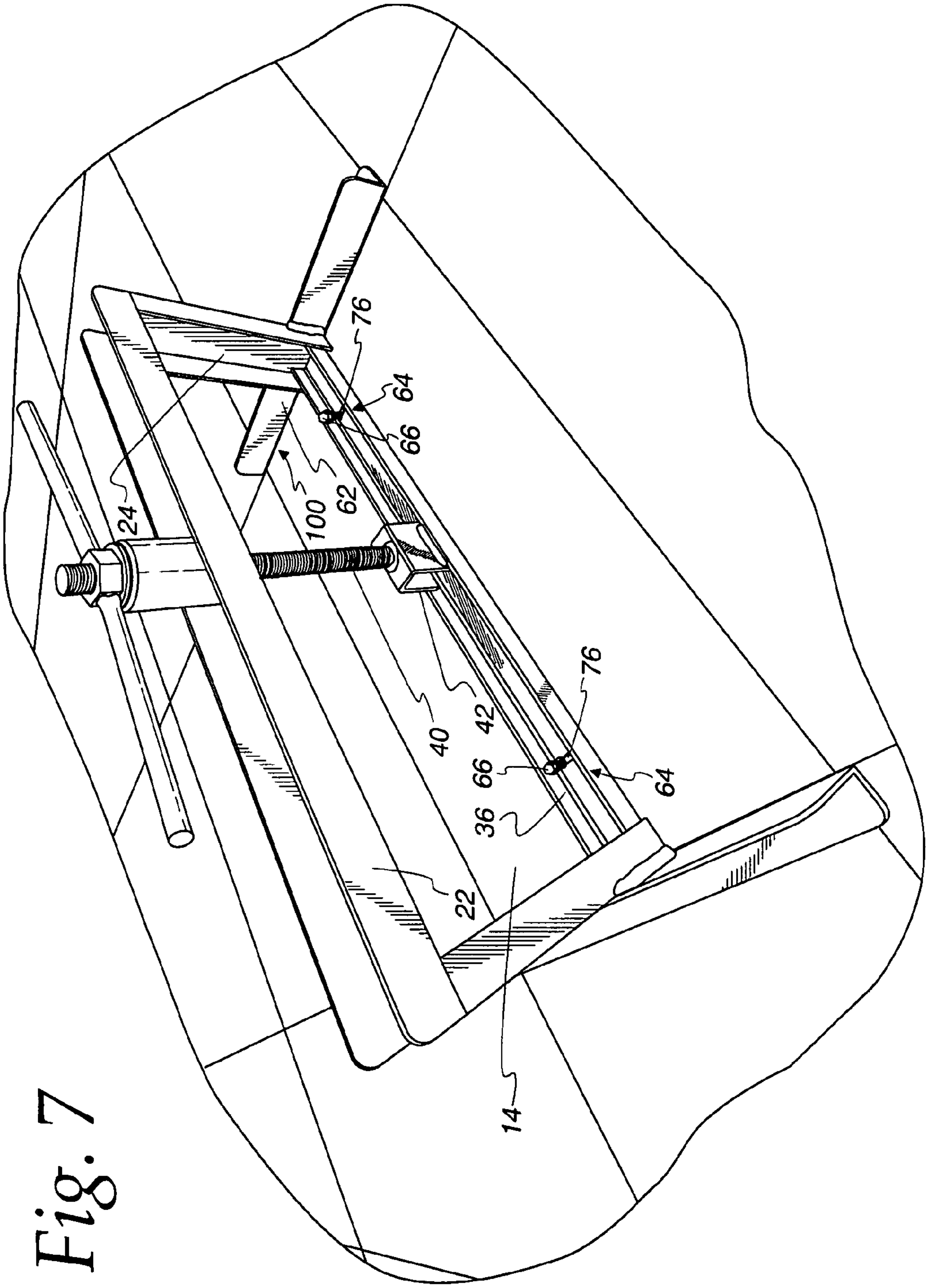
FIG. 7 is another fragmentary perspective view thereof.
Figure 8:
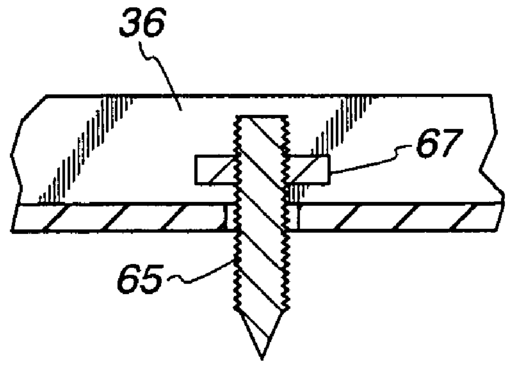
FIG. 8 is a fragmentary cross-sectional view of an alternative embodiment.

As mentioned, tool 10 preferably provides upward lifting force that is applied to surface component 14. Attachment to the surface component and engagement between tool 10 and the fastener may be accomplished in several different ways, as will be seen. With reference to FIGS. 7 and 8, in the preferred embodiment, attachment is provided by drilling one or more holes in surface component 14 and screwing bolt-like threaded concrete fasteners 64 or 65 (see FIG. 8) into the one or more holes to provide engagement with surface component 14, with the fastener extending upwardly beyond the surface component. In the preferred embodiment shown for example in FIG. 7, the fastener 64 includes an enlarged head 66 and a threaded portion for engaging the surface component with a screw action. In the preferred embodiment, fastener 64 comprises a threaded concrete fastener commercially available under the trade name TAPCON, made commercially available by Illinois Tool Works of Schaumburg, Ill.

Figure 2:
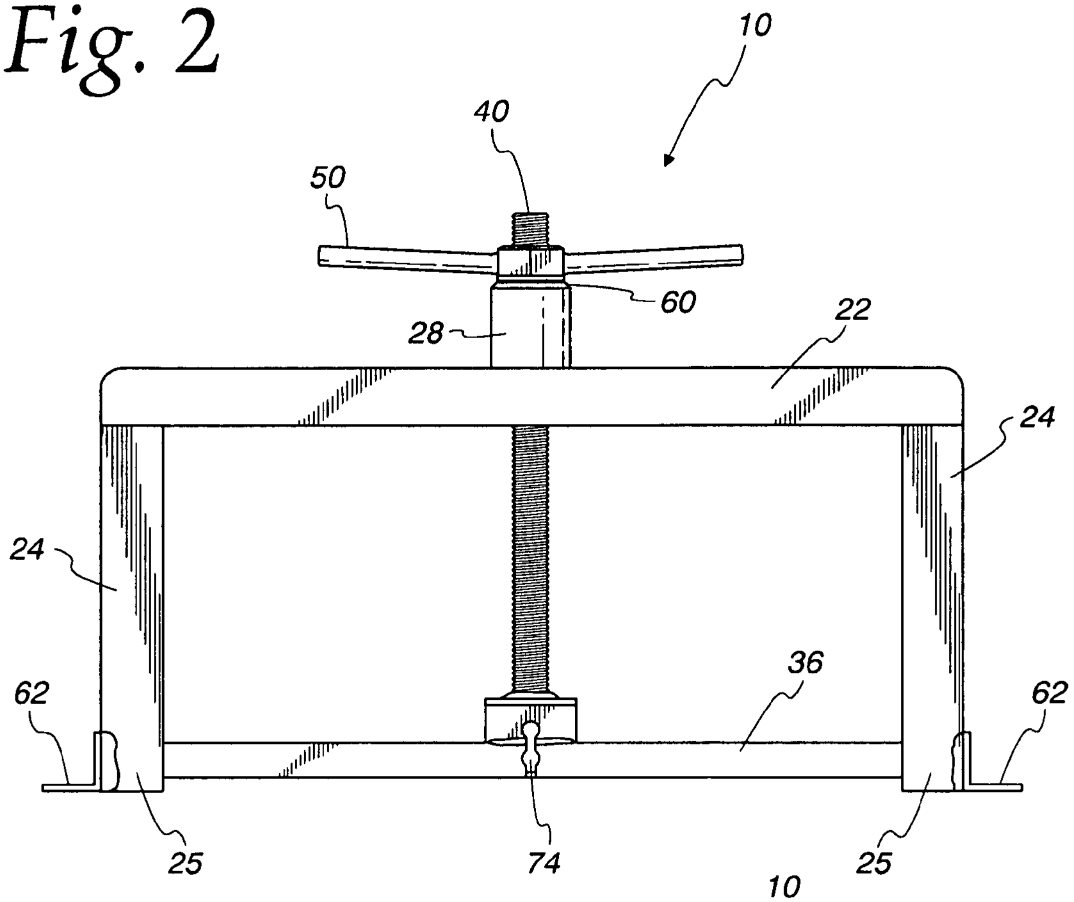
FIG. 2 is a front elevational view thereof.
Figure 3:
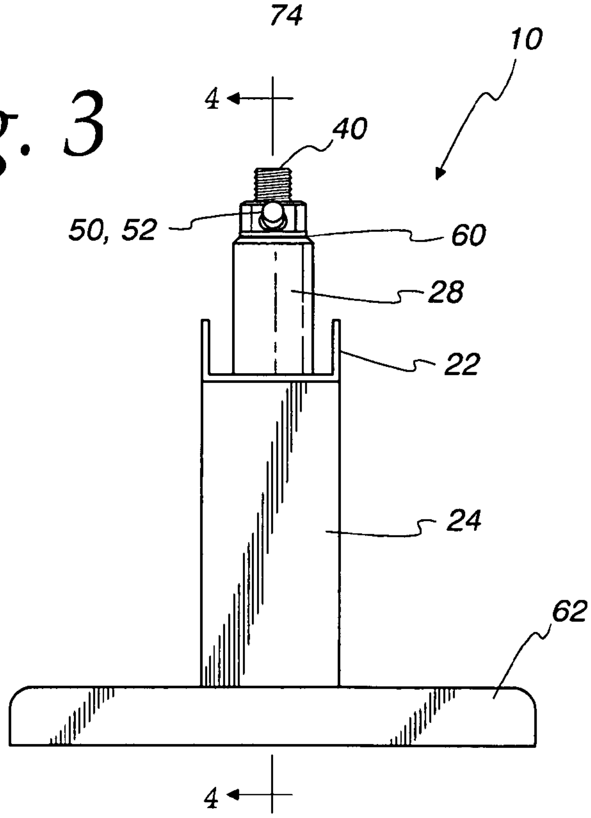
FIG. 3 is a side elevational view thereof.
Figure 5:
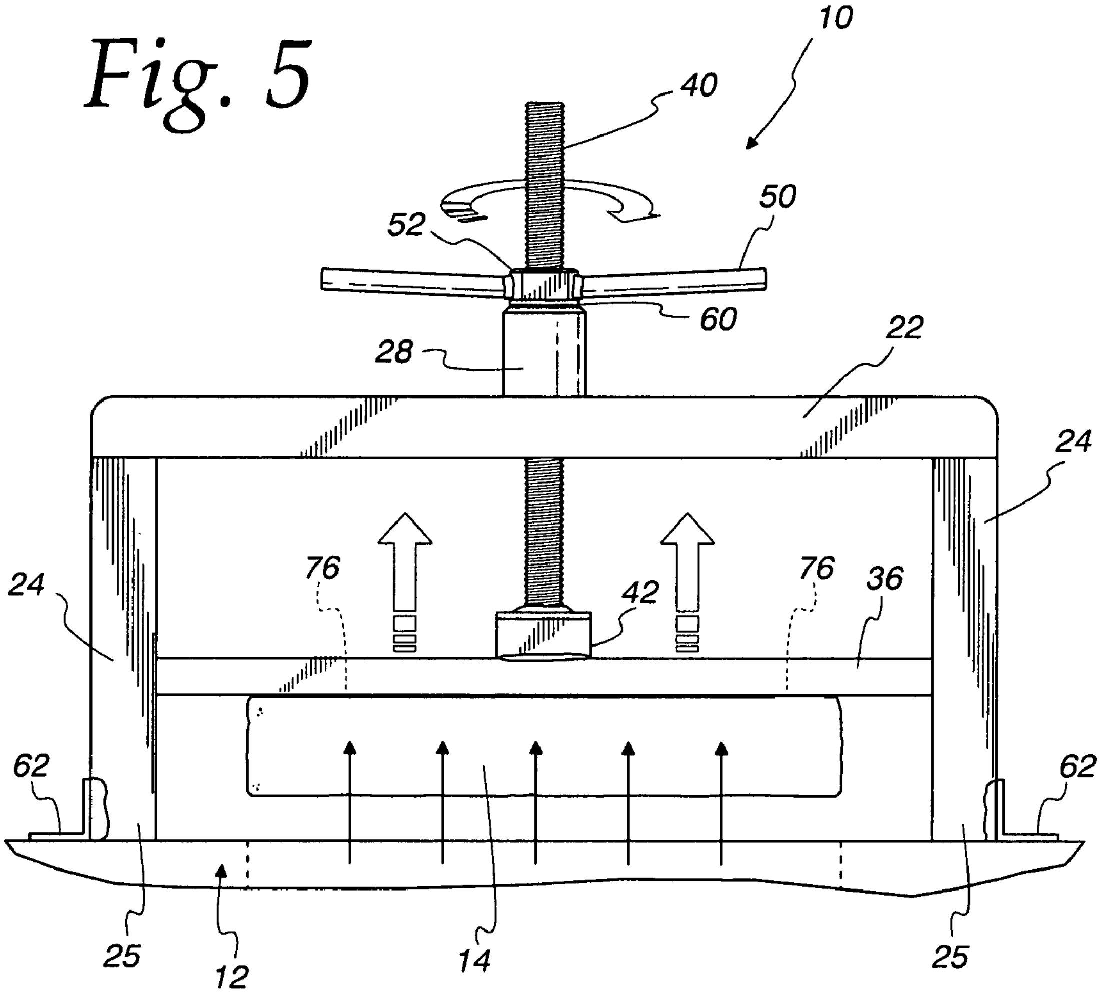
FIG. 5 is a front elevational view thereof showing lifting of a surface component.
Figure 6:
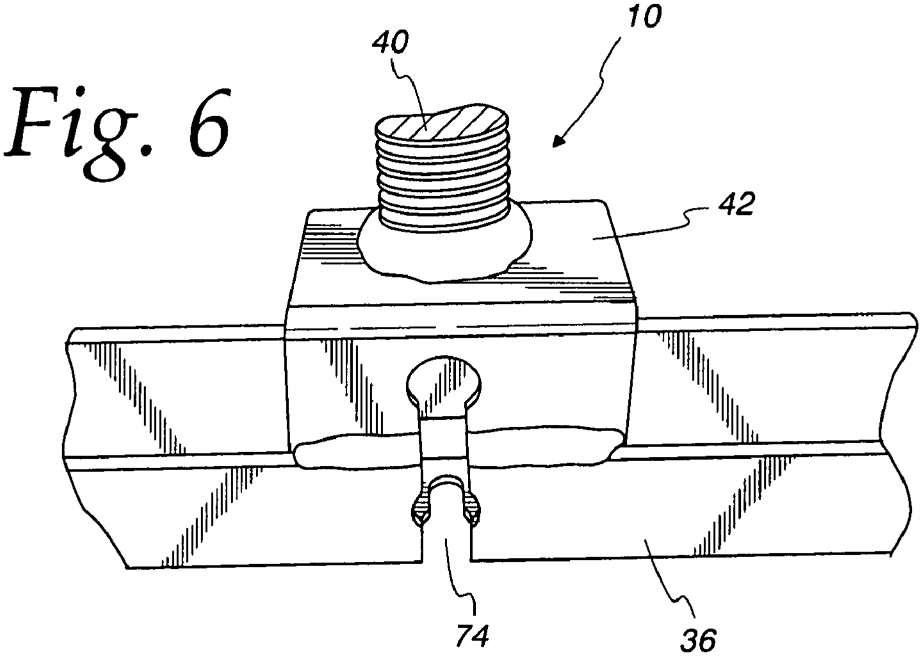
FIG. 6 is a fragmentary perspective view thereof.

With reference to FIGS. 1, 2 and 6, when fastener 64 (shown in FIG. 7) is fully engaged with surface component 14, its enlarged head 66 preferably protrudes above the upper surface of surface component 14, so as to be received in an engagement in the form of a keyhole slot 74 provided in lift plate 36 and mounting block 42. In the embodiment shown in FIGS. 1, 2 and 6, keyhole slot 74 is provided at the center of lift plate 36, as is generally preferred for alignment with a solitary fastener located at the approximate center of surface component 14. At times, only a single fastener may be required to lift a surface component 14 and accordingly keyhole 74 would be employed in this instance. However, larger surface components may require additional fasteners to deliver the needed lifting force to the surface component, and accordingly a pair of keyhole slots 76 may be provided in lift plate 36 in the manner indicated in FIGS. 5 and 7 (in FIG. 5 the keyhole slot structures are hidden from view, but their locations 76 along lift plate 36 are indicated. In either event, an enlarged head 66 of fastener 64 is inserted in each keyhole slot in a customary manner to provide lifting engagement between fastener 64 and lift plate 36. As can be seen in FIG. 6, the keyhole slot may also open downwardly, allowing tool 10 to be nudged along surface 12 in a forward direction, to capture the upper portion of fastener 64 and enlarged head 66 in lift plate 36.

Figure 9:
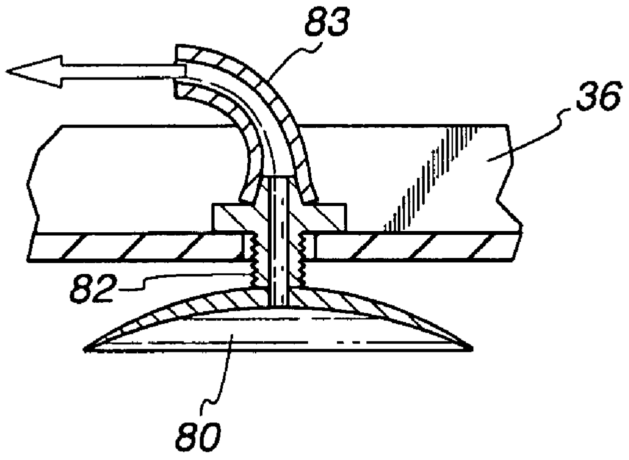
FIG. 9 is a fragmentary cross-sectional view of another alternative embodiment.

Alternatively, fastener 64 may be provided with an upper threaded portion in place of an enlarged head, as shown in FIG. 8. In this arrangement, the threaded upper portion 65 of a threaded stud is inserted in a hole formed in the bottom of lift plate 36 and a nut 67 engages the stud. In this latter type of arrangement where the fastener includes an upper threaded end, the keyhole features illustrated in the Figures may be replaced with round holes dimensioned to fit the fastener, as is customary. As a further alternative to threaded fasteners, the fasteners may be secured to surface component 14 using an adhesive material, or suction forces may be applied to the surface of surface component 14 to provide the lifting attachment necessary. Referring to FIG. 9, one or more suction cups 80 with hollow fastener stems 82 are attached to lift plate 36 using threaded fasteners, metallurgical joinder or other conventional arrangements. As indicated in FIG. 9, the hollow fastener stem 82 is coupled to a vacuum source via conduit 83, with vacuum applied to cup 80, to engage the upper surface of surface component 14. Vacuum engagement may be enhanced with the use of an attachment such as a gel or liquid applied to the surface of component 14 prior to engagement with the vacuum cup. In some instances, an attachment structure may be omitted altogether. If desired, manually operated pneumatic suction cups may be employed, thus omitting the need for an external vacuum source.

Exemplary operation of tool 10 to extract a surface component 14 will now be described. Initially, one or more attachments, such as fasteners 64, are installed in surface component 14, as required to provide the lifting force necessary to extract surface component 14 from surface 12.

When a single fastener is sufficient to carry the applied load, tool 10 (as shown in FIGS. 1, 2, 4 and 6) is slid along surface 12 so as to bring the enlarged head 66 of the fastener (see FIG. 7) into the keyhole slot 74. If two fasteners are required, the lift plate shown in FIG. 7 is lowered past the enlarged heads 66 and tool 10 is thereafter slid to lock the fasteners into engagement with the narrow part of the keyhole slots, in the manner indicated in FIG. 7. If a stem fastener is employed, the lift plate of FIG. 8 is lowered past the stud, and nut fastener 67 is employed to lock the lift plate to the fastener. If a vacuum attachment is employed, suction cups 80 as shown in FIG. 9 are placed in contact with the upper surface of surface component 14. Sealing engagement between cups 80 and surface component 14 may be augmented using liquids such as water, gels or the like, and vacuum is applied to the cups 80 to provide secure attachment with surface component 14.

A set up of tool 10 is accomplished by installing the tool above the surface 12, with feet 62 located on either side of the surface component 14 to be extracted. Preferably feet 62 are maintained in contact with the surrounding surface 12. If desired, workmen may stand on the feet 62, or sandbags or other weights may be used to enhance intimate, high friction contact with surface 12, so as to prevent tool 10 from "walking," rotating or otherwise moving away from its intended operational position above the chosen surface component.

When a manual lifting device in the form of the handle 50 is employed, the handle is threadingly advanced along the upper end of drive screw 40, until the bottom surface 56 of the handle contacts the upper bearing surface 60 of collar 28 (see FIG. 4). Handle 50 is thereafter advanced an additional amount until slack is taken out of the engagement between lift plate 36 and the attachment arrangement secured to surface component 14. Thereafter, handle 50 is advanced additional amounts, preferably one quarter turn at a time, raising lift plate 36 while maintaining feet 62 in frictional contact surface 12, sufficient to prevent rotation, creeping or other displacement of tool 10. Preferably, handle 50 is advanced in incremental steps, e.g., one quarter turn at a time, with a slight pause between turns to allow the tool to "settle" as may be dictated by the circumstances.

In practice, it has been observed that the alignment between drive screw 40 and frame 20 may not always be aligned in a true vertical direction, but may be "off" from a true alignment by some small amount. Further, although the peripheral edges of surface component 14 are illustrated as being aligned along a true vertical direction with a constantly maintained spacing with the remainder of surface 12, this may not be experienced in practice. Accordingly, it may be desirable in certain instances to "walk" the surface component out of surface 12 by tilting or rocking the surface component slightly away from a true vertical direction, alternating the rocking motion in different directions so as to weaken the grip between surface component 14 and surface 12, to loosen the surface component with continued lifting force applied by rotating handle 50. In order to augment the "walking" or "rocking" motion of surface component 14, it is generally preferred that the inner bore of collar 28 be oversized, preferably with upper surface 60 being rounded, so as to allow the threaded shaft 40 passing through the collar to be laterally offset slight amounts as handle 50 is threadingly advanced along the drive screw. This motion may be described as tilting, oscillating or rocking the drive screw with respect to collar 28. It is generally preferred for these and other reasons that the mating bearing surfaces of bottom surface 56 of handle 50 and the upper surface 60 of collar 28 allow for smooth sliding back and forth, even under application of considerable weight imparted to collar 28 by handle 50. As will now be appreciated, the lift member (e.g. drive screw 40) extends from the lift plate 36, with an upper end extending through the cross member 22 so as to engage the lifting device (e.g. handle 50). In this manner, the lift member is mounted for tilting displacement with respect to the cross member as the lift member is raised by the lifting device to lift the block-like surface component 14 above the surface 12.

With reference to FIG. 5, surface component 14 will eventually clear surface 12. At this point, it is generally preferred that further threaded advancement of handle 50 not be required to lift the surface component 14 away from its original site. The entire tool 10, with surface component 14 attached could be lifted away from the work site, although it is generally preferred that lifting of only the lift plate 36 and surface component 14 attached thereto be required. Accordingly, it is generally preferred that drive screw 40 be free to travel within collar 28 in an upward direction and that there be no threading engagement or other interference between collar 28 and drive screw 40. If desired, the entire tool 10 could be slid laterally after the surface component is raised above surface 12, so as to bring surface component 14 away from its original installment site. However, it may be desirable in some instances to protect the appearance of the surrounding portions of surface 12. Accordingly, by lifting only the lift plate with surface component 14 attached rather than the entire tool 10, wooden strips or other slide members may be installed to provide a convenient sliding support for surface component 14 away from its original installation site, while preventing abrasive sliding contact between the surface component and the surrounding portions of surface 12. The surface component is then released from tool 10, allowing the tool to be relocated to another extraction site.

Figure 10:
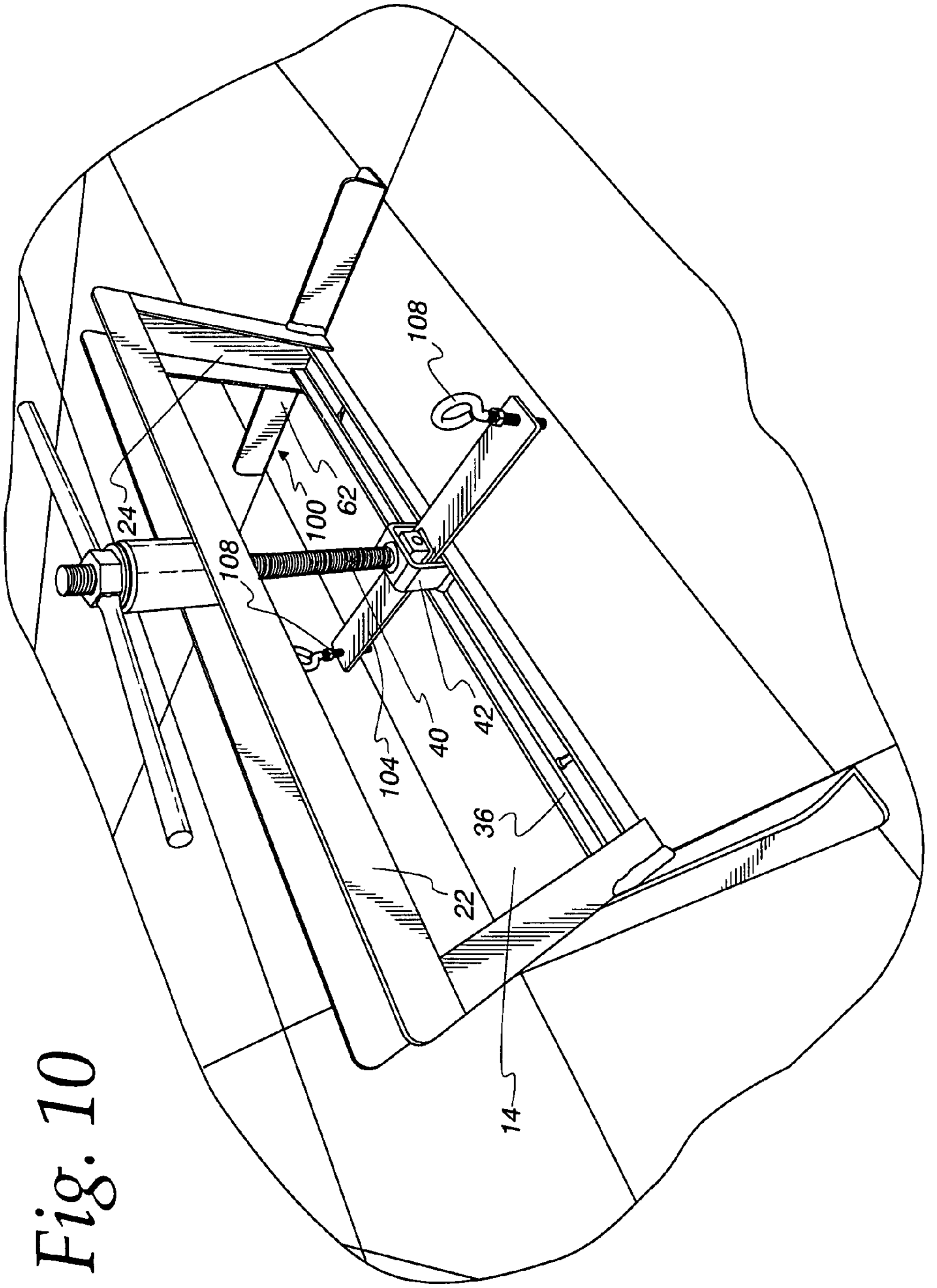
FIG. 10 is a perspective view of a further alternative embodiment.

Referring now to FIG. 10, an alternative embodiment of an extraction tool generally indicated at 100. Extraction tool 100 is preferably substantially identical to the extraction tool 10 described above, except for the addition of a stabilizer member 104 attached to the mid-section of lift plate 36. In the preferred embodiment illustrated, stabilizer member 104 is made from relatively thick gauge metal bar stock, the mid-section of which is welded, brazed or otherwise joined to the mid-section of lift plate 36, adjacent mounting block 42. If desired, stabilizer member 104 may be trapped between lift plate 36 and mounting block 42, so as to be mounted for sliding back and forth with respect to the lift plate. As shown, optional turn screws 108 are located adjacent the ends of stabilizer member 104, and are threadably advanceable toward the surface component 14 being extracted. Once the lift plate 36 is engaged with the surface component 14, and prior to raising the surface component, the turn screws are advanced to engage the surface component, to prevent the surface component from swinging, or rocking about the axis of lift plate 36 as the plate is lifted. As will be appreciated, the surface components being extracted can have considerable mass, and the applied extraction forces may impart a considerable momentum to the surface component as it is cleared of contact with the surrounding surface. The stabilizer member 104 extends at an angle, preferably approximately 90 degrees, to the lift plate 36 to prevent swinging or rocking of the surface component about the narrow straight line contact with the lift plate.

If desired, more than one stabilizer member may be employed about the lift plate. As a further alternative, the stabilizer member may have ends that are bent to contact the surface component directly, thus eliminating the need for turn screws. The stabilizer member may be made of spring steel or other resilient construction to aid in maintaining a restraint against rocking of the surface component.

Although exemplary implementations of the invention have been depicted and described in detail herein, it will be apparent to those skilled in the relevant art that various modifications, additions, substitutions and the like can be made without departing from the spirit of the invention and these are therefore considered to be within the scope of the invention as defined in the following claims.

What is claimed is:

1. A tool for extracting a surface component having an attachment and located within a surface, comprising:

- a cross member having a medial portion defining an aperture, located between opposed ends;
- a surface-engaging support for supporting the ends of the cross member above the surface;
- a lifting device above the cross member to receive support therefrom;
- a lift plate below the cross member with an engagement for engaging the attachment of the surface component; and
- a lift member extending from the lift plate, having an upper end extending through the cross member aperture and engaging the lifting device so that the lift member is mounted for tilting displacement with respect to the cross member as the lift member is raised by the lifting device to lift the surface component above the surface;
- wherein the lifting device is a handle, the tool further comprising a tilting guide between the handle and the cross member, including an upper bearing surface for engaging the handle, a lower surface supported by the cross member and defining an aperture and the lift member upper end extends through the tilting guide aperture.

2. The tool according to claim 1 wherein the tilting guide comprises a hollow collar including the upper bearing surface for engaging the handle and the lower surface supported by the cross member.

3. The tool according to claim 2 wherein the lift member comprises a drive screw having an upper threaded end extending through the cross member aperture, the hollow collar and threadingly engaging the handle.

4. The tool according to claim 2 wherein the collar freely rests on the cross member.

5. The tool according to claim 1 wherein the support includes two legs, one supporting each end of the cross member.

6. The tool according to claim 5 wherein the lift plate is located between the legs, with opposed ends in sliding support with the legs and the legs define channels for receiving and guiding the ends of the lift plate.

7. The tool according to claim 6 wherein the legs include feet to engage the surface, preventing rotation of the legs with respect to the surface.

8. The tool according to claim 7 wherein the feet extend laterally beyond the legs to provide a pair of steps.

9. A tool for extracting a surface component having an attachment and installed within a surface, comprising:
- a cross member having a medial portion defining an aperture, located between opposed ends;
- a surface-engaging support for supporting the ends of the cross member above the surface and to support the cross member against rotation with respect to the surface;
- a lift plate below the cross member with an engagement for engaging the attachment of the surface component;
- a lift member extending from the lift plate, having an upper end extending through the cross member aperture;
- a rotary lifting device having a rotary lifting motion, located above the cross member to receive support therefrom as the rotary lifting device rotates to develop a lifting force to raise the lift member;
- the upper end of the lift member engaging the rotary lifting device so that the lift member and hence the surface component is raised by the rotary lifting device; and
- a tilting guide between the lifting device and the cross member, including an upper bearing surface for engaging the lifting device, a lower surface supported by the cross member and defining an aperture, and the lift member upper end extends through the tilting guide aperture.

10. The tool according to claim 9 wherein the support includes two legs, one supporting each end of the cross member.

11. The tool according to claim 10 wherein the lift plate is located between the legs, with opposed ends in sliding support with the legs and the legs define channels for receiving and guiding the ends of the lift plate.

12. The tool according to claim 11 wherein the legs include feet extending laterally beyond the legs to engage the surface, preventing rotation of the legs with respect to the surface.

13. The tool according to claim 9 wherein the tilting guide comprises a hollow collar including the upper bearing surface for engaging the lifting device and the lower surface supported by the cross member.

14. The tool according to claim 9 wherein the lift member comprises a drive screw having an upper threaded end extending through the cross member aperture, the hollow collar and threadingly engaging the rotary lifting device.

15. A method for extracting a surface component having an attachment and located within a surface, comprising:
- providing a cross member having a medial aperture located between opposed ends;
- supporting the ends of the cross member above the surface with a surface-engaging support;
- supporting a lifting device on the cross member;
- providing a lift plate below the cross member;
- providing the lift plate with an engagement for engaging the attachment of the surface component;
- extending a lift member from the lift plate through the cross member aperture and engaging the lifting device with the lift member so as to mount the lift member for tilting displacement with respect to the cross member as the lift member is raised by the lifting device to lift the surface component above the surface;
- providing the lifting device with a handle;
- supporting a tilting guide on the cross member;
- providing the tilting guide with an upper bearing surface; and
- engaging the bearing surface with the handle so that the handle is mounted for tilting displacement with respect to the cross member as the lift member is raised by the handle.

16. The method according to claim 15 further comprising mounting opposed ends of the lift plate in sliding engagement with the surface-engaging support.

17. The method according to claim 16 wherein the surface-engaging support comprises legs defining channels for receiving and guiding the ends of the lift plate.

18. The method according to claim 17 further comprising providing the legs with feet engaging the surface so as to prevent rotation of the legs with respect to the surface.

19. A method for extracting a surface component having an attachment and installed within a surface, comprising:
- providing a cross member with a medial aperture located between opposed ends;
- supporting the ends of the cross member above the surface with a support to resist rotation;
- engaging the support with the surface so as to resolve downward and rotational forces applied through the support;
- providing a lift plate located below the cross member with an engagement for engaging the attachment of the surface component;
- extending a lift member from the lift plate, through the cross member aperture;
- supporting a rotary lifting device having a rotary lifting motion with the cross member so as to support the rotary lifting device as the rotary lifting device rotates to develop a lifting force to raise the lift member;
- engaging the lift member with the rotary lifting device so as to raise the lift member and hence the surface component above the surface;
- supporting a tilting guide on the cross member;
- providing the tilting guide with an upper bearing surface; and
- engaging the bearing surface with the rotary lifting device so that the rotary lifting device is mounted for tilting displacement with respect to the cross member as the lift member is raised by the handle.

20. The method according to claim 19 wherein the support comprises legs engaging the surface with a friction engagement to resist rotation of the feet with respect to the surface, the legs defining channels for receiving and guiding the ends of the lift plate.

* * * * *